US012145112B2

(12) United States Patent
Al-Sarkhi et al.

(10) Patent No.: US 12,145,112 B2
(45) Date of Patent: Nov. 19, 2024

(54) METHODS AND SYSTEMS FOR THE GENERATION OF STABLE OIL-IN-WATER OR WATER-IN-OIL EMULSION FOR ENHANCED OIL RECOVERY

(71) Applicants: SAUDI ARABIAN OIL COMPANY, Dhahran (SA); KING FAHD UNIVERSITY OF PETROLEUM & MINERALS, Dhahran (SA)

(72) Inventors: Abdelsalam Mohammad Al-Sarkhi, Dhahran (SA); Omer Abdelazim Salim, Dhahran (SA); Mohamed Nabil Noui-Mehidi, Dhahran (SA); Ahmad Rizq, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 1048 days.

(21) Appl. No.: 17/088,991

(22) Filed: Nov. 4, 2020

(65) Prior Publication Data

US 2022/0135868 A1    May 5, 2022

(51) Int. Cl.
*B01F 23/41*    (2022.01)
*B01F 23/45*    (2022.01)
(Continued)

(52) U.S. Cl.
CPC .......... *B01F 23/41* (2022.01); *B01F 23/4105* (2022.01); *B01F 23/45* (2022.01);
(Continued)

(58) Field of Classification Search
CPC .......... B01F 25/28; B01F 25/23; B01F 25/27; B01F 25/432; B01F 25/46; B01F 33/813;
(Continued)

(56) References Cited

U.S. PATENT DOCUMENTS 1,578,187 A    3/1926 Bullock
4,499,946 A    2/1985 Martin et al.
(Continued)

FOREIGN PATENT DOCUMENTS

CA    1041995 A    11/1978
CA    2534746 A1    7/2007
(Continued)

OTHER PUBLICATIONS

Isamu Fujita et al., "A New Oil Recovery System using Steam-driven Ejector"; OCEANS 2007, #070131-003; Europe, Aberdeen; Sep. 17, 2007 (6 pages).
(Continued)

*Primary Examiner* — Charles Cooley
(74) *Attorney, Agent, or Firm* — Osha Bergman Watanabe & Burton LLP

(57) ABSTRACT

Systems for generating stable emulsions may employ one or more liquid-liquid ejectors for mixing the oil with water through motive and suction streams to produce the emulsion as a discharge stream. One or more motive tanks may be fluidly coupled to the one or more liquid-liquid ejectors; the one or more motive tanks may supply the one or more liquid-liquid ejectors with a motive fluid. One or more suction tanks may be fluidly coupled to the one or more liquid-liquid ejectors; the one or more suction tanks may supply the one or more liquid-liquid ejectors with a suction fluid. One or more discharge tanks may be fluidly coupled to the one or more liquid-liquid ejectors; the one or more discharge tanks may collect an emulsion from the one or more liquid-liquid ejectors. Additionally, a flow line coupled to the one or more discharge tanks may feed the emulsions into a formation.

9 Claims, 4 Drawing Sheets

(51) Int. Cl.
| | | |
|---|---|---|
| *B01F 23/80* | (2022.01) | |
| *B01F 25/30* | (2022.01) | |
| *B01F 25/50* | (2022.01) | |
| *B01F 25/64* | (2022.01) | |
| *B01F 33/80* | (2022.01) | |
| *B01F 35/21* | (2022.01) | |
| *B01F 101/00* | (2022.01) | |
| *C09K 8/58* | (2006.01) | |
| *E21B 43/16* | (2006.01) | |

(52) U.S. Cl.
CPC .............. *B01F 23/80* (2022.01); *B01F 25/30* (2022.01); *B01F 25/50* (2022.01); *B01F 33/80* (2022.01); *C09K 8/58* (2013.01); *E21B 43/16* (2013.01); *B01F 23/4142* (2022.01); *B01F 23/4145* (2022.01); *B01F 25/64* (2022.01); *B01F 33/836* (2022.01); *B01F 35/2111* (2022.01); *B01F 2101/505* (2022.01)

(58) Field of Classification Search
CPC .. B01F 35/2211; B01F 35/2213; B01F 23/41; B01F 23/4105; B01F 23/45; B01F 23/80; B01F 25/30; B01F 25/50; B01F 33/80; B01F 23/4142; B01F 23/4145; B01F 25/64; B01F 33/836; B01F 35/2111; B01F 2101/505; B01F 25/211; B01F 25/31243; B05B 1/02; B05B 1/26; B05B 7/0846; B05B 7/1481; B05B 12/08; B05B 15/20; B05B 15/65; E21B 21/062; E21B 43/16; C09K 8/58; C09K 8/584
USPC ........................................................ 366/159.1
See application file for complete search history.

(56) References Cited

U.S. PATENT DOCUMENTS

| | | | |
|---|---|---|---|
| 4,605,069 | A | 8/1986 | McClaflin et al. |
| 2004/0122111 | A1 | 6/2004 | Varadaraj et al. |
| 2012/0297665 | A1 | 11/2012 | Goerz, Jr. |
| 2014/0202702 | A1* | 7/2014 | Cobb .................. B01F 25/4335 166/307 |
| 2016/0202231 | A1* | 7/2016 | Black .................. G01N 33/2835 73/61.46 |
| 2017/0232407 | A1* | 8/2017 | Cobb .................... B01F 23/451 |
| 2020/0222319 | A1* | 7/2020 | Rönnback ............... B01F 33/84 |
| 2022/0135868 | A1* | 5/2022 | Al-Sarkhi ........... B01F 23/4105 166/305.1 |

FOREIGN PATENT DOCUMENTS

| | | |
|---|---|---|
| CN | 2627376 Y | 7/2004 |
| CN | 1641202 A | 7/2005 |
| CN | 200985779 Y | 12/2007 |
| KR | 20020053135 A | 7/2002 |
| RU | 2297436 C2 | 4/2007 |
| RU | 2647524 C2 | 3/2018 |
| WO | 1989/012158 A1 | 12/1989 |
| WO | 1992/011927 A1 | 7/1992 |
| WO | 0181718 A1 | 11/2001 |
| WO | 2013053036 A1 | 4/2013 |
| WO | 2015/048135 A1 | 4/2015 |
| WO | 2015/138429 A1 | 9/2015 |
| WO | 2016/174128 A1 | 11/2016 |
| WO | 2018/095881 A1 | 5/2018 |
| WO | 2019/195606 A1 | 10/2019 |

OTHER PUBLICATIONS

Tushar Sharma et al., "Enhanced oil recovery using oil-in-water (o/w) emulsion stabilized by nanoparticle, surfactant and polymer in the presence of NaCl"; Geosystems Engingeering, vol. 17, No. 3, pp. 195-205; Published Sep. 22, 2014 (11 pages).
T. R. Briggs, "Emulsions with Finely Divided Solids"; The Journal of Industrial and Engineering Chemistry, vol. 13, No. 11, pp. 1008-1010; Published Nov. 1921 (3 pages).
J. James et al., "Scale-up of batch rotor-stator mixers. Part 2—Mixing and Emulsification"; Accepted Manuscript to be Published in the Chemical Engineering Research and Design, vol. 124, No. 2, pp. 321-329; 2017 (25 pages).
Giorgio Besagni, "Ejectors on the cutting edge: The past, the present, and the perspective"; Energy, vol. 170, pp. 998-1003; Published Jan. 4, 2019 (6 pages).
X.C. Cao et al., "Experimental Study of Plate Freezer with the Ejector"; Procedia Engineering, vol. 121, pp. 1238-1244; 2015 (7 pages).
Tongchana Thongtip et al., "Development and performance of a heat driven R141b ejector air conditioner: Application in hot climate country"; Energy, vol. 160, pp. 556-572; Published Jul. 11, 2018 (17 pages).
Kamil Smierciew et al., "Application of numerical modelling for design and imporvement of performance of gas ejector"; Applied Thermal Energy, vol. 149, pp. 85-93; Published Dec. 6, 2018 (9 pages).
Deepankar Sharma et al., "Effect of turbulent dispersion on hydrodynamic characteristics in a liquid jet ejector"; Energy, vol. 164, pp. 10-20; Published Aug. 25, 2018 (11 pages).
J. T. Davies, "A Physical Interpretation of Drop Sizes in Homogenizers and Agitated Tanks, Including the Dispersion of Viscous Oils"; Chemical Engineering Science, vol. 42, No. 7, pp. 1671-1676; 1987 (6 pages).
Laurent Taisne et al., "Transfer of Oil between Emulsion Droplets"; Journal of Colloid and Interface Science, vol. 184, Article No. 0632, pp. 378-390; 1996 (13 pages).
Ganesan Narsimhan et al., "Drop Coalescence during Emulsion Formation in a High-Pressure Homogenizer for Tetradecane-in-Water Emulsion Stabilized by Sodim Dodecyl Sulfate"; Journal of Colloid and Interface Science, vol. 238, pp. 420-432; 2001 (13 pages).
Andrew J. Green, "Jet Pumps and Ejectors"; Thermopedia 2011; Available Online: <http://www.thermopedia.com/content/902> (4 pages).
Deepankar V. Sharma et al., "Estimation of gas induction in jet loop reactors: Influence of nozzle designs"; Chemical Engingeering Research and Design, vol. 125, pp. 24-34; Published Jun. 27, 2017 (11 pages).
J. James et al., "Scale-up of bath rotor-stator mixers. Part 1—power constants"; Chemical Engineering Research and Design, vol. 124, pp. 313-320; Published Jun. 23, 2017 (8 pages).
International Search Report and Written Opinion issued in Application No. PCT/US2021/058086, mailed on Mar. 1, 2022 (14 pages).

* cited by examiner

METHODS AND SYSTEMS FOR THE GENERATION OF STABLE OIL-IN-WATER OR WATER-IN-OIL EMULSION FOR ENHANCED OIL RECOVERY

BACKGROUND

Enhanced oil recovery (EOR) enables the extraction of hydrocarbon reserves that conventional primary and secondary recovery processes cannot access, such as gas or water displacement. EOR may be performed using emulsion injection. Conventional emulsion generation techniques used in the oil field for Chemical EOR (CEOR) are batch generation methods, using pumps, mechanical stirrers, mixers or colloid mills. Conventional emulsion generation techniques generate emulsions in batches and store the produced emulsion in storage tanks until they required in the field. Giving that emulsions are thermodynamically unstable materials consisting of two liquids, they tend to separate back to their pure states, affecting emulsion properties, which may make such emulsions inefficient for performing in formations after being stored. Moreover, for commercial production, the size of mechanical stirrers is very large, consuming high power and unable to generate stable emulsions.

Depending on the characteristics of the formation and the treatment fluid, it may be helpful to first emulsify an acid before pumping it down the wellbore. The preparation of acid emulsion is traditionally performed off-site, i.e., at a location that is away from the wellsite, and is generally based on a batch mixing method. An example of the prior art system 1 is shown in FIG. 1A. There, a large tank (not shown) is employed to re-circulate an acid mixture until a complete homogenous state is achieved. The emulsifying agent is transferred into a batch tank 14 and then the blended acid is added to the batch tank 14. A pump 18 is then used to re-circulate the tank 14 until the desired emulsion is created. Once the emulsion is created, the contents of the batch tank 14 can be delivered to the wellsite as a finished product ready for injection. As shown in FIG. 1B, the pump 18 may be used to continuously produce emulsions. A premix of the oil and emulsifier(s) 11, and a discontinuous phase 12, i.e., water, are introduced in a circulating loop via suitable means such as pipes 13a and 13b, respectively, into a circulating loop vessel 4. The pump 14 may be a centrifugal circulating pump, which is employed to circulate the material within the loop. The emulsion is removed via outlet 15. This emulsion can then be further refined for uniformity of product by passing through a suitable mixing means, e.g., a static mixer or a homogenizer 17. Drain 16 is employed to remove all residual material from the loop when needed for cleaning.

Batch mixing is disadvantageous for several reasons. First, it is often challenging to plan the logistics such as storage and transportation beforehand to ensure sufficient acid is available at the wellsite when an acid treatment needs to be performed on a wellbore. The stored emulsion may be less efficient or totally expired if not used for long time. Second, batch-to-batch variations may occur, which could result in inconsistencies in treatment result. Additionally, a ratio of water to oil in the emulsion generated in conventional methods cannot be changed once the emulsion is generated. Third, degradations may occur during the process of storage and transportation. Fourth, while batch mixing a small volume of acid emulsions is not a significant issue, it can become very difficult when the volumes needed is very large. The batch methods are difficult to be applied for mass production of emulsion, especially for EOR which require large quantities of emulsion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for generating a stable emulsion. The method may include: pumping a motive fluid from a motive fluid tank to a first inlet of a liquid-liquid ejector, the liquid-liquid ejector applying suction to a second inlet of the liquid-liquid ejector via the flow of motive fluid through the liquid-liquid ejector, the suction pulling a suction fluid from a suction tank; mixing the motive fluid and the suction fluid in the liquid-liquid ejector; ejecting an emulsion of the motive fluid and the suction fluid from an outlet of the liquid-liquid ejector; and collecting the emulsion in a discharge tank. The method may further include conveying the emulsion from the discharge tank to the motive fluid tank. Additionally, the method may include measuring a flow rate of the motive fluid and the suction fluid entering the liquid-liquid ejector, and changing a speed of a pump pumping the motive fluid based on the measured flow rate. In addition, the method may include adding one or more surfactants to the motive fluid and/or the suction fluid upstream of the liquid-liquid ejector. The method may include injecting the emulsion from the discharge tank into a formation. Furthermore, the method may include controlling an external phase of the emulsion based on a water salinity. When the water salinity less than 10 g/L, the external phase is water, and an oil-in-water emulsion is formed. When the water salinity more than 10 g/L, the external phase is oil, and a water-in-oil emulsion is formed. The method may also include adjusting the emulsion by one or more of using water with a different salinity, adjusting pump speed, and/or adjusting ejector orifice sizes.

In another aspect, embodiments disclosed herein relate to a method for generating a stable emulsion that may include: pumping a motive fluid from a motive fluid tank to a first inlet of a liquid-liquid ejector located inside a suction tank; mixing the motive fluid with a suction fluid in the suction tank after a pressure energy of a flow of the motive fluid is converted to kinetic energy through a nozzle of the liquid-liquid ejector; ejecting an emulsion of the motive fluid and the suction fluid from an outlet of the liquid-liquid ejector; and collecting the emulsion in a discharge tank. The method may further include injecting the emulsion from the discharge tank into a formation. Additionally, the method may also include discharging the emulsion from the liquid-liquid ejector to a separator upstream of the discharge tank; separating the emulsion, in the separator, from incompletely mixed motive and/or suction fluid; and feeding the separated emulsion to the discharge tank.

In yet another aspect, embodiments disclosed herein relate to a system for generating a stable emulsion. The system may include: one or more motive tanks fluidly coupled to one or more liquid-liquid ejectors, wherein the one or more motive tanks may be configured to supply the one or more liquid-liquid ejectors with a motive fluid; one or more suction tanks fluidly coupled to the one or more liquid-liquid ejectors, wherein the one or more suction tanks may be configured to supply the one or more liquid-liquid ejectors with a suction fluid, wherein the motive fluid and the suction fluid may be mixed in the one or more liquid-liquid ejectors; one or more discharge tanks fluidly coupled to the one or more liquid-liquid ejectors, wherein the one or more discharge tanks may be configured to collect an emulsion from the one or more liquid-liquid ejectors; and a flow line coupled to the one or more discharge tanks, wherein the flow line may be configured to feed the emulsion into a formation. At least one of the one or more liquid-liquid ejectors may be a stand-alone ejector. At least one of the one or more liquid-liquid ejectors may be immersed within the one or more suction tanks. The system may further include one or more pumps fluidly coupled to the one or more motive tanks and the one or more discharge tanks. The system may also include a second flow line fluidly coupling the one or more discharge tanks to the one or more motive tanks.

Other aspects and advantages of the claimed subject matter will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1A:
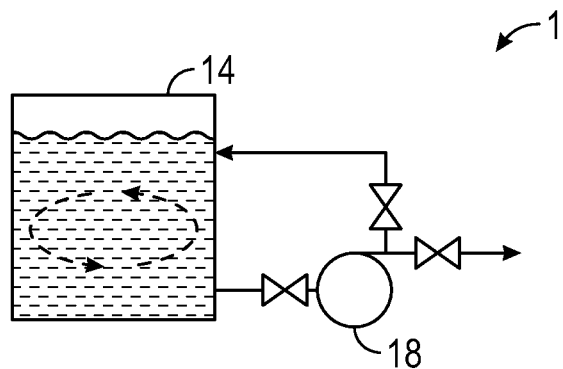
FIG. 1A is a schematic illustration of a batch mixing system according to a prior art embodiment.
Figure 1B:
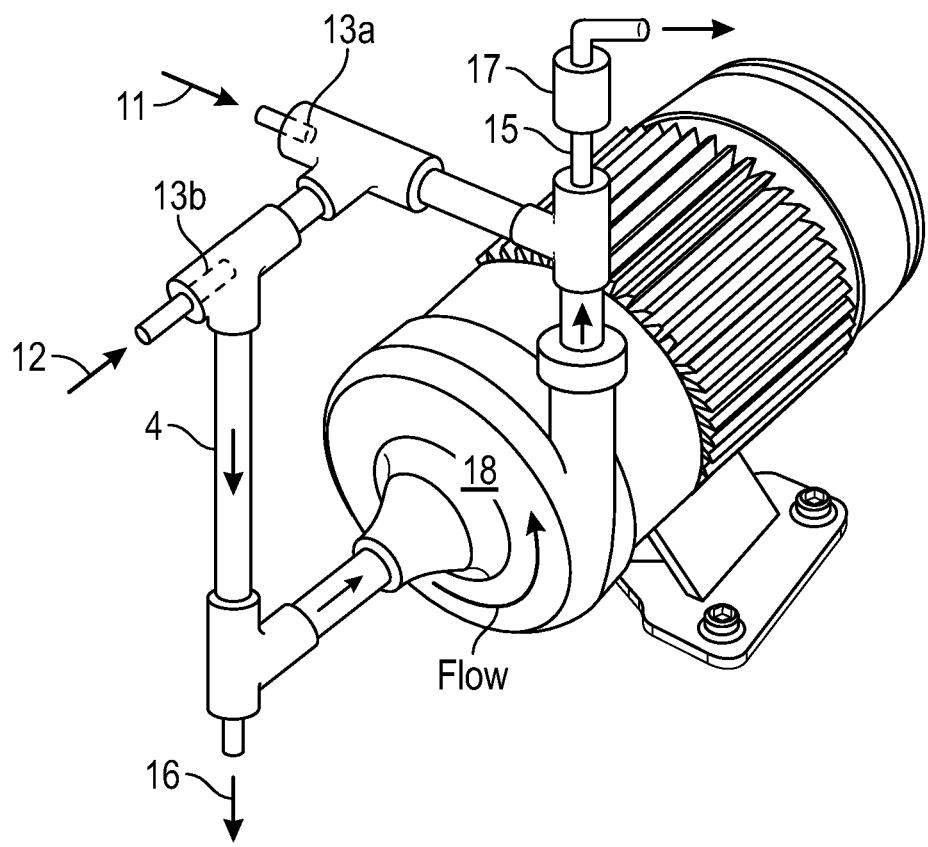
FIG. 1B is a perspective illustration of a system for producing emulsions according to a prior art embodiment.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with the hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures. As used herein, the term "coupled" or "coupled to" or "connected" or "connected to" "attached" or "attached to" may indicate establishing either a direct or indirect connection, and is not limited to either unless expressly referenced as such. As used herein, fluids may refer to slurries, liquids, gases, and/or mixtures thereof.

Embodiments in accordance with the present disclosure generally relate to methods and systems for generating emulsions for use in a hydrocarbon-containing subterranean formation. Such methods and systems may be directed to Chemical Enhanced Oil Recovery (CEOR) processes, and generating in-line water-in-oil and oil-in-water stable emulsions with specified water to oil ratios using a liquid-liquid ejector, such as a jet pump. The oil may be a hydrocarbon such as diesel fuel and the water may be ordinary tap water with different salinity concentrations. In a non-limiting example, different salinity concentration may be obtained by an addition of salt, seawater, partially desalinated seawater, ground water. In some embodiments, the water may be ran through a filter such as a reverse osmosis device. While embodiments disclosed herein are generally discussed with respect to the Enhanced Oil Recovery processes, it should be noted that the system and processes disclosed herein could be used in any situation where stable emulsion on-demand is desired. Examples of such other processes and systems may include: generating a diesel emulsion upstream of a diesel engine; generation of phase change emulsions (PC-MEs) for Heating Ventilation & Air conditioning (HVAC) systems; generation of pharmaceutical emulsions to be used as medicines, drugs, hair, and skin conditioning agents; and generation of emulsions in the food industry.

In some embodiments, an external phase of the generated emulsion may be controlled by water salinity (e.g., total dissolved solids, TDS) for diesel-in-water or water-in-diesel emulsions. In a non-limiting example, for water TDS less than 10 g/L, the external phase may be water, and oil-in-water emulsion may be formed. For water TDS more than 10 g/L, the external phase may be oil, and water-in-oil emulsion may be generated. In addition, the water to oil ratio may be controlled by suction or discharge valves. Further, the final emulsion may be adjusted by using water with a different salinity, adjusting pump speed, and/or adjusting ejector orifice sizes.

The methods and systems of one or more embodiments may employ one or more liquid-liquid ejectors for mixing the oil with water through motive and suction streams to produce the emulsion as a discharge stream. A stability of the generated emulsion may be enhanced by an addition of one or more surfactants to one of the two streams of water and oil before mixing in the one or more liquid-liquid ejectors. The one or more liquid-liquid ejectors may convert a pressure energy of the motive fluid to velocity energy to mix the motive fluid (i.e., high pressure) with the suction fluid (i.e., low pressure). Additionally, either of the two streams may be oil while the other may be water depending on available resources and equipment with no effect on the type and properties of the generated emulsion. For example, in one or more embodiments, the motive fluid may be a hydrocarbon, such as diesel, and the suction fluid may be water. In other embodiments, the motive fluid may be water and the suction fluid may be a hydrocarbon, such as diesel.

In one or more embodiments, the methods and systems for generating emulsions may simply consist of one single pump, motive and suction sources of water and oil, connecting lines, control valves, and one liquid-liquid ejector. Additionally, the methods and systems for generating emulsions may be scaled up with multiple pumps, ejectors, and tanks to obtain emulsions with different specifications. It is further envisioned that depending on the configuration and desired emulsion properties, the motive fluid supplied by a pump may be oil while the suction fluid may be water, or the motive fluid may be water while the suction fluid may be oil.

Figure 2:
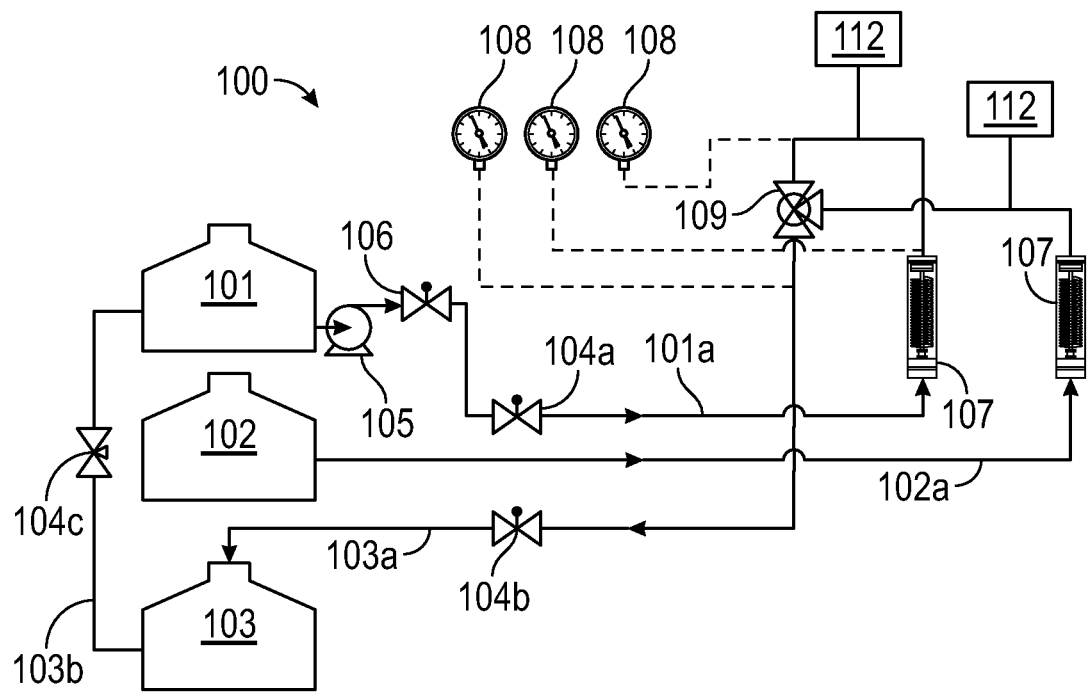
FIGS. 2-4 are schematic depictions of a system for generating emulsions in accordance with one or more embodiments of the present disclosure.

FIG. 2 illustrates a schematic depiction of an emulsion generating system 100 in accordance with one or more embodiments of the present disclosure. The emulsion generating system 100 of FIG. 2 may be referred to herein as a stand-alone ejector pilot loop. The stand-alone ejector pilot loop 100 may include one or more motive liquid tanks 101, one or more suction liquid tanks 102, and one or more discharge tanks 103.

In one or more embodiments, one or more pumps 105, such as centrifugal pumps, may be fluidly coupled to the motive liquid tank 101, the suction liquid tank 102, and/or the discharge tank 103. The one or more pumps 105 may be variably operated depending on the flow rate required. Additionally, the one or more pumps 105 may be accompanied with a control valve 106 to control the flow rate of the corresponding stream, such as a motive stream. It is further envisioned that a motive control valve 104a may be provided on a motive line 101a to further control the flow rate of the motive stream. Further, the stand-alone ejector pilot loop 100 may include one or more flow meters 107 and one or more pressure gauges 108. The stand-alone ejector pilot loop 100 may have any number of flow meters 107 and pressure gauges 108 without departing from the scope of the present disclosure. In a non-limiting example, the one or more flow meters 107 and the one or more pressure gauges 108 may be provided on a motive line 101a and a suction line 102a to measure flow rate and pressure of the corresponding streams from the motive liquid tank 101 and the suction liquid tank 102. In addition, a discharge control valve 104b may be provided on a first discharge line 103a to control the flow rate of a discharge stream.

Still referring to FIG. 2, in one or more embodiments, one or more stand-alone liquid-liquid ejectors 109 may be fluidly coupled to the motive liquid tank 101, the suction liquid tank 102, and the discharge tank 103. In a non-limiting example, the one or more stand-alone liquid-liquid ejectors 109 may include two inlets to receive fluids from the motive liquid tank 101 and the suction liquid tank 102, while having one outlet to send fluids to the discharge tank 103. Additionally, the one or more liquid-liquid ejectors 109 may use a pressure energy of the motive stream in the motive line 101a from the motive liquid tank 101 to draw a suction stream in the suction line 102a from the suction liquid tank 102. The one or more stand-alone liquid-liquid ejectors 109 may then mix the motive and suctions streams to generate emulsions to flow to the discharge tank 103 via the first discharge line 103a. The generated emulsion may be stored in the discharge tank 103 for a period of time until injection into a formation is required.

In one or more embodiments, mixing of fluids from the discharge tank 103 and the motive liquid tank 101 may be desired. A second discharge line 103b may fluidly connect the discharge tank 103 to the motive liquid tank 101. In some embodiments, pressure differentials or gravity may allow transfer between tank 103 and 101 via second discharge line 103b, and only a shut off valve or control valve 104c may be required. In other embodiments, a transfer pump (not illustrated) and valving 104c may be used to control a flow of fluid from tank 103 to tank 101.

In some embodiments, a stability of the generated emulsion may be enhanced by an addition of one or more surfactants to one of the two streams of water and oil before mixing in the one or more liquid-liquid ejectors 109. In a non-limiting example, the motive line 101a and the suction line 102a may each have an inlet, upstream the one or more liquid-liquid ejectors 109, to receive the one or more surfactants from one or more surfactant tanks 112. The one or more surfactants may be any compound to lower a surface tension (or interfacial tension) between two liquids, such as detergents, wetting agents, emulsifiers, or dispersants.

Figure 3:
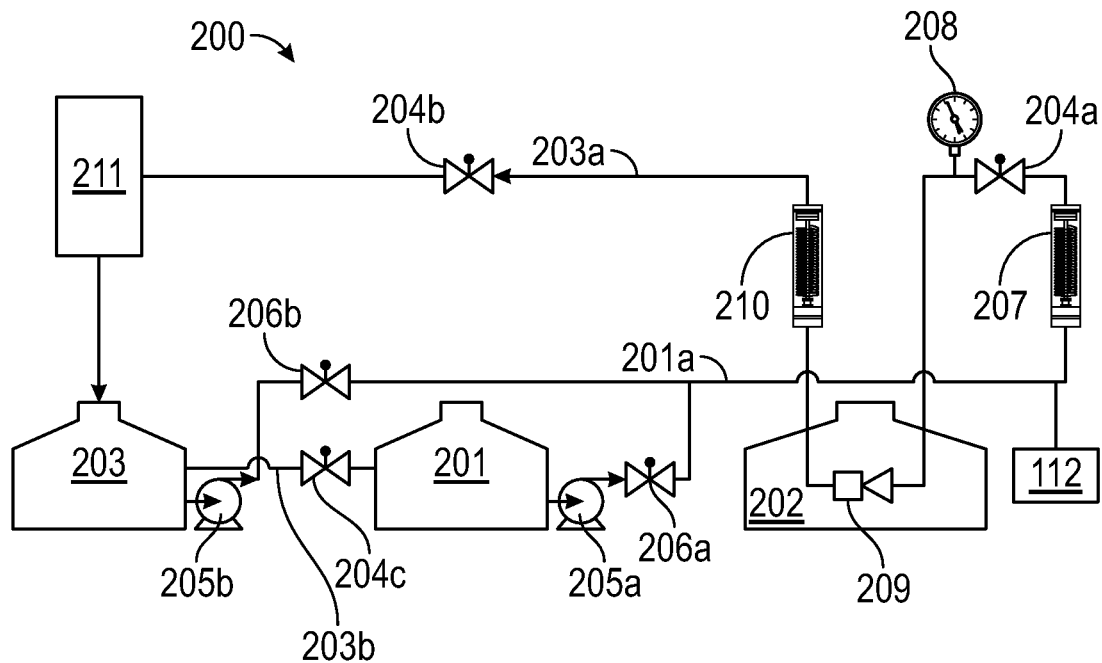

Now referring to FIG. 3, FIG. 3 illustrates a schematic depiction of an emulsion generating system 200 in accordance with one or more embodiments of the present disclosure. The emulsion generating system 200 of FIG. 3 may be referred to herein as a submersible ejector pilot loop. The submersible ejector pilot loop 200 may include one or more motive liquid tanks 201, one or more suction liquid tanks 202, and one or more discharge tanks 203.

In one or more embodiments, one or more pumps 205a, 205b, such as centrifugal pumps, may be fluidly coupled to the motive liquid tank 201, the suction liquid tank 202, and/or the discharge tank 203. The one or more pumps 205a, 205b may be operated depending on the flow rate required. Additionally, the one or more pumps 205a, 205b may be accompanied with control valves 206a, 206b to control the flow rate of the corresponding stream, such as a motive stream. It is further envisioned that a motive control valve 204a may be provided on a motive line 201a to further control the flow rate of the motive stream. Further, one or more flow meters 207 and one or more pressure gauges 208 may be provided on the motive line 201a. The submersible ejector pilot loop 200 may have any number of flow meters 207 and pressure gauges 208 without departing from the scope of the present disclosure. In a non-limiting example, the one or more flow meters 207 and the one or more pressure gauges 208 may measure a flow rate and pressure of stream with the motive line 201a.

In one or more embodiments, the submersible ejector pilot loop 200 may include one or more submersible liquid-liquid ejectors 209 immersed within a suction liquid tank 202. In a non-limiting example, the one or more submersible liquid-liquid ejectors 209 may be located inside the suction liquid tank 202 so the pressure energy of the motive stream may be used to draw and mix with the liquid in the suction liquid tank 202 after being converted to kinetic energy through a nozzle of the one or more submersible liquid-liquid ejectors 209. The one or more submersible liquid-liquid ejectors 209 may then mix the motive and suctions streams to generate emulsions to flow to the discharge tank 203 via a first discharge line 203a. Additionally, a discharge flow meter 210 may be installed on the first discharge line 203a downstream the one or more submersible liquid-liquid ejectors 209 to measure a flow rate of discharge stream which may equal a sum of the flow rates in the motive and suction stream.

In some embodiments, a container 211, such as a separator, may be fluidly coupled to the first discharge line 203a. The container 211 may be upstream of the discharge tank 203 such that the one or more submersible liquid-liquid ejectors 209 feed a resulting emulsion mixture into the container 211. The container 211 may be used to separate the emulsions from other fluids, or motive and/or suction fluid that do not form part of the stable emulsion. It is further envisioned that from the container 211, the emulsion may be selectively separated and fed to the discharge tank 203, while the motive and/or suction fluids separated may be returned to the motive tank 201 or the suction liquid tank 202, respectively (not illustrated). In addition, a discharge control valve 204b may be provided on the first discharge line 203a to control the flow rate of the discharge stream to the container 211.

In one or more embodiments, mixing of fluids from the discharge tank 203 and the motive liquid tank 121 may be desired. A second discharge line 203b may fluidly connect the discharge tank 203 to the motive liquid tank 201. In some embodiments, pressure differentials or gravity may allow transfer between tank 203 and 201 via second discharge line 203b, and only a shut off valve or control valve 204c may be required. In other embodiments, a transfer pump (not illustrated) and valving 204c may be used to control a flow of fluid from tank 203 to tank 201. In some embodiments, the pump 205b accompanied with the control valves 206b may be used to control the flow rate of a discharge stream being mixed into the motive line 201a.

In some embodiments, a stability of the generated emulsion may be enhanced by an addition of one or more surfactants to one of the two streams of water and oil before mixing in the one or more submersible liquid-liquid ejectors 209. In a non-limiting example, the motive line 201a may have an inlet, upstream the one or more submersible liquid-liquid ejectors 209, to receive the one or more surfactants from one or more surfactant tanks 212. The one or more surfactants may be nay compound to lower a surface tension (or interfacial tension) between two liquids, such as detergents, wetting agents, emulsifiers, or dispersants.

Figure 4:
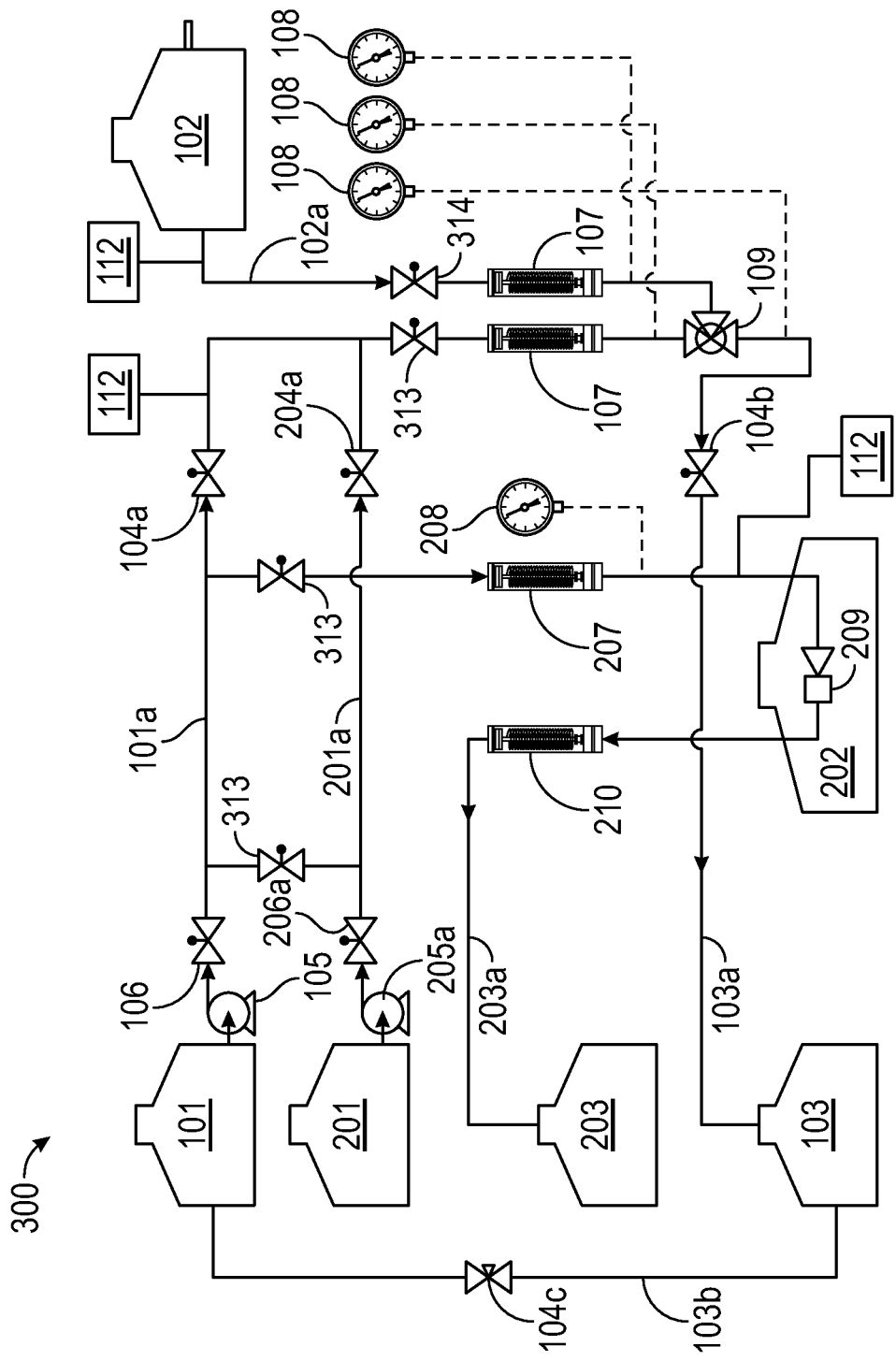

Now referring to FIG. 4, FIG. 4 illustrates a schematic depiction of an emulsion generating system 300 in accordance with one or more embodiments of the present disclosure. The emulsion generating system 300 of FIG. 4 may be referred to herein as a combined ejector pilot loop. The combined ejector pilot loop 300 of FIG. 4 is similar to that of the embodiments of FIGS. 2 and 3, where like numerals represent like parts. However, in the combined ejector pilot loop 300, both the one or more liquid-liquid ejectors 109 and the one or more submersible liquid-liquid ejectors 209 may be provided within the system such that the combined ejector pilot loop 300 is a combination of the stand-alone ejector pilot loop (see 100 of FIG. 2) and the submersible ejector pilot loop (see 200 of FIG. 3). In the combined ejector pilot loop 300, the two motive tanks 101, 201 may be filled, for example, with water of two different salinities or surfactant percentages in each tank separately. Similarly, the two suction tanks 102, 202 in the combined ejector pilot loop 300 may both be filled with oils having different weights, API gravity, compositions, and/or additives. In other embodiments of the combined ejector pilot loop 300, the two motive tanks 101, 201 may be filled, for example, with oil of two different weights in each tank separately. Similarly, the two suction tanks 102, 202 in the combined ejector pilot loop 300 may both be filled with water of two different salinities or surfactant percentages in each tank separately. Additionally, one or more secondary control valves 313 may be provided on the motive streams 101a, 201a to further control the flow rate of the motive stream. Further, one or more suction control valves 314 may be provided on the suction line 102a to further control the flow rate of the suction stream. In a non-limiting example, the pump 105 may be operated and the suction valve 314 may be opened such that a generated emulsion may be obtained in the discharge tank 103 from the discharge stream of the one or more liquid-liquid ejectors 109. Therefore, the combined ejector pilot loop 300 with both the stand-alone ejector pilot loop and the submersible ejector pilot loop, may offer multiple choices of emulsion generation. It is further envisioned that any number of tanks, pumps, ejectors may be used depending on the application and required specifications without departing from the scope of the present disclosure.

EXAMPLES

The following examples are merely illustrative and should not be interpreted as limiting the scope of the present disclosure. Experiments were conducted using the emulsion generating systems (100, 200, 300) as depicted by FIGS. 2-4. The most difficult cases are when the volume of the internal phase (dispersed phase) of the emulsion is greater than the external phase, i.e., more than 50% is dispersed in the other phase. Some of the results are presented below for water-in-oil W/O and oil-in-water O/W stable emulsion. The emulsifier used in these experiments is a U108 emulsifier (Schlumberger Technology Corporation, Sugar Land, Tex.), which is soluble in diesel fuel. All presented emulsions in table 1 are stable, i.e., they do not separate to their original phases for several days and some of them for several months. Table 2 and 3 shows how efficient is controlling the percentage of the two liquids using the discharge valve and the suction valve. The controlling using the discharge valve is more efficient than the suction valve. As seen, by adjusting one or more of the TDS, pump pressure, or suction orifice diameter (indicated as a change in suction pressure), the final external phase may be adjusted to meet on-specification demand.

TABLE 1

Stable Emulsion

| Emulsion | Motive, % | Suction, % | Ejector Type | Water TDS gr/l | External Phase |
| --- | --- | --- | --- | --- | --- |
| Ej.01 | Water, 41.5% | Diesel, 58.5% | Stand Alone | 9.02 | Water |
| Ej.02 | Water, 36.2% | Diesel, 63.8% | Stand Alone | 2.19 | Water |
| Ej.03 | Diesel, 56.5% | Water, 43.5% | Stand Alone | 18 | Diesel |
| Ej.04 | Diesel, 56.5% | Water, 43.5% | Stand Alone | 16 | Diesel |
| Ej.05 | Diesel, 56.1% | Water, 43.9% | Stand Alone | 30 | Diesel |
| Ej.09 | Diesel, 56.2% | Water, 43.8% | Stand Alone | 10 | Water |
| Ej.10 | Diesel, 60% | Water, 40% | Stand Alone | 30 | Diesel |
| Ej.13 | Diesel, 54% | Water, 46% | Stand Alone | 30 | Diesel |
| Ej.14 | Water, 58.6% | Diesel, 41.4% | Stand Alone | 30 | Diesel |
| Ej.15 | Water, 55.2% | Diesel, 44.8% | Stand Alone | 30 | Diesel |
| Ej.21 | Water, 60% | Diesel, 40% | Stand Alone | 30 | Diesel |
| Ej.17 | Water, 45.9% | Diesel, 54.1% | Stand Alone | 30 | Diesel |
| Ej.18 | Water, 43.6% | Diesel, 56.4% | Stand Alone | 30 | Diesel |
| JP.01 | Water, 33.3% | Diesel, 66.6% | Submersible | 30 | Diesel |

TABLE 2

Flow Parameters of Discharge-Controlled Experiment (Stand Alone Ejector)

| Position | Motive Flowrate (L/s) and % (Water) | Suction Flowrate (L/s) and % (Diesel) | Motive Pressure (Kg/cm$^2$) | Suction Pressure (Kg/cm$^2$) | Discharge Pressure (Kg/cm$^2$) |
|---|---|---|---|---|---|
| 1 | 0.10725 (39.5%) | 0.1640 (60.5%) | 2.7 | −0.22 | 0.14 |
| 2 | 0.10725 (42.5%) | 0.1451 (57.5%) | 2.7 | −0.2 | 0.2 |
| 3 | 0.10725 (43.6%) | 0.1388 (56.4%) | 2.7 | −0.18 | 0.22 |
| 4 | 0.10725 (45.9%) | 0.1262 (54.1%) | 2.7 | −0.16 | 0.25 |
| 5 | 0.10725 (48.6%) | 0.1135 (51.4%) | 2.7 | −0.14 | 0.3 |
| 6 | 0.10725 (51.5%) | 0.1009 (48.5%) | 2.7 | −0.12 | 0.35 |
| 7 | 0.10725 (54.8%) | 0.0883 (45.2%) | 2.7 | −0.1 | 0.4 |
| 8 | 0.10725 (58.6%) | 0.0757 (41.4%) | 2.7 | −0.07 | 0.45 |
| 9 | 0.10725 (63%) | 0.0631 (37%) | 2.7 | −0.05 | 0.48 |
| 10 | 0.10725 (68%) | 0.0505 (32%) | 2.7 | −0.05 | 0.51 |
| 11 | 0.10725 (74%) | 0.0378 (26%) | 2.7 | 0 | 0.53 |

TABLE 3

Flow Parameters of Suction-Controlled Experiment (Stand Alone Ejector)

| Position | Motive Flowrate (L/s) and % (Water) | Suction Flowrate (L/s) and % (Diesel) | Motive Pressure (Kg/cm$^2$) | Suction Pressure (Kg/cm$^2$) | Discharge Pressure (Kg/cm$^2$) |
|---|---|---|---|---|---|
| 1 | 0.10725 (39.5%) | 0.1640 (60.5%) | 2.7 | −0.22 | 0.14 |
| 2 | 0.10725 (41.5%) | 0.1514 (58.5%) | 2.7 | −0.28 | 0.12 |
| 3 | 0.10725 (45.9%) | 0.1262 (54.1%) | 2.7 | −0.35 | 0.1 |
| 4 | 0.10725 (48.6%) | 0.1135 (51.4%) | 2.7 | −0.38 | 0.09 |
| 5 | 0.10725 (54.8%) | 0.0883 (45.2%) | 2.7 | −0.42 | 0.07 |
| 6 | 0.10725 (58.6%) | 0.0757 (41.4%) | 2.7 | −0.45 | 0.05 |

Accordingly, one or more embodiments in the present disclosure may be used to overcome challenges as well as provide additional advantages over conventional emulsion generating systems, as will be apparent to one of ordinary skill. As shown in FIGS. 2-4, in one or more embodiments, the various components of emulsion generating system (100, 200, 300) may provide fresh on-demand emulsions without a need for storage in the field. The generated emulsion from the emulsion generating system (100, 200, 300) may be more efficient than the stored emulsion. Furthermore, the ratio of water to oil may be controlled and changed during the process while the emulsion generating system (100, 200, 300) is operating, unlike the batch generated emulsion which has a fixed ratio for the whole batch. The emulsion generating system (100, 200, 300) may save the time and effort consumed by the emulsion preparation stage of the conventional methods. Since, the emulsion generating system (100, 200, 300) directly supply emulsion to required application, without the need for a preparation stage. Overall, the emulsion generating system (100, 200, 300) may minimize product engineering, risk associated with flow loops manufacture, reduction of assembly time, hardware cost reduction, and weight and envelope reduction.

Figure 5:
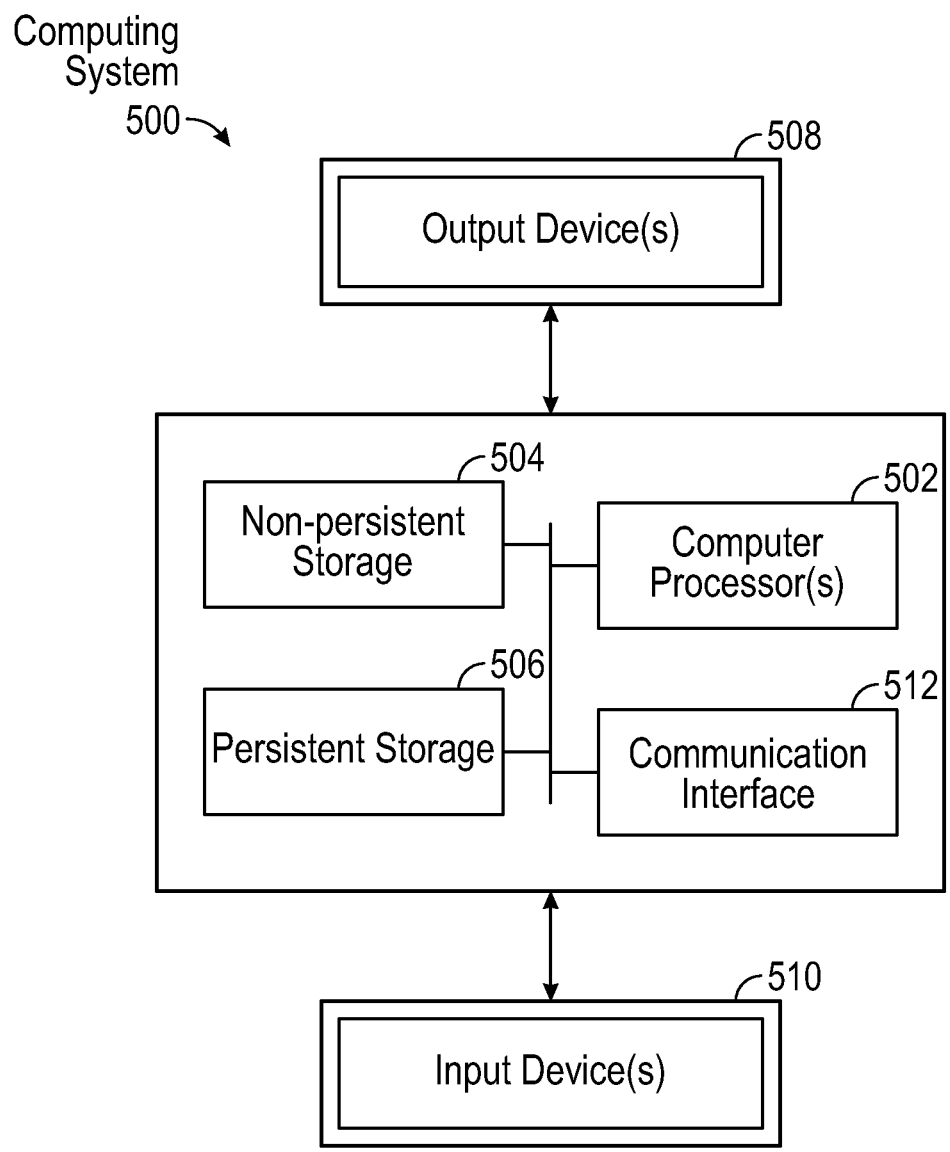
FIG. 5 is a schematic diagram of a computing system in accordance with one or more embodiments.

Implementations herein for operating the emulsion generating system (100, 200, 300) may be implemented on a computing system coupled to a controller. Any combination of mobile, desktop, server, router, switch, embedded device, or other types of hardware may be used with the emulsion generating system (100, 200, 300). For example, as shown in FIG. 5, the computing system 500 may include one or more computer processors 502, non-persistent storage 504 (e.g., volatile memory, such as random access memory (RAM), cache memory), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), and numerous other elements and functionalities. It is further envisioned that software instructions in a form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. For example, the software instructions may correspond to computer readable program code that, when executed by a processor(s), is configured to perform one or more embodiments of the disclosure.

The computing system 500 may also include one or more input devices 510, such as a touchscreen, keyboard, mouse, microphone, touchpad, electronic pen, or any other type of input device. Additionally, the computing system 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing systems exist, and the aforementioned input and output device(s) may take other forms.

The computing system 500 of FIG. 5 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model. For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device. Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

While the invention has been described with respect to a limited number of embodiments, those skilled in the art, having the benefit of this disclosure, will appreciate that other embodiments can be devised that do not depart from the scope of the invention as described herein. Accordingly, the scope of the invention should be limited only by the accompanying claims.

What is claimed is:

1. A method for generating a stable emulsion, the method comprising:
    pumping a motive fluid from a motive fluid tank to a first inlet of a liquid-liquid ejector, the liquid-liquid ejector applying suction to a second inlet of the liquid-liquid ejector via the flow of motive fluid through the liquid-liquid ejector, the suction pulling a suction fluid from a suction tank;
    mixing the motive fluid and the suction fluid in the liquid-liquid ejector;
    ejecting an emulsion of the motive fluid and the suction fluid from an outlet of the liquid-liquid ejector;
    collecting the emulsion in a discharge tank, and
    conveying the emulsion from the discharge tank to the motive fluid tank.

2. The method of claim 1, further comprising measuring a flow rate of the motive fluid and the suction fluid entering the liquid-liquid ejector.

3. The method of claim 2, further comprising changing a speed of a pump pumping the motive fluid based on the measured flow rate.

4. The method of claim 1, further comprising adding one or more surfactants to the motive fluid and/or the suction fluid upstream of the liquid-liquid ejector.

5. The method of claim 1, further comprising injecting the emulsion from the discharge tank into a formation.

6. The method of claim 1, further comprising controlling an external phase of the emulsion by changing a salinity of a water phase, wherein the motive fluid comprises the water phase and the suction fluid comprises an oil phase.

7. The method of claim 6, wherein when the water salinity is less than 10 g/L, the external phase is water, and an oil-in-water emulsion is formed.

8. The method of claim 6, wherein when the water salinity is more than 10 g/L, the external phase is oil, and a water-in-oil emulsion is formed.

9. The method of claim 1, further comprising adjusting the emulsion by one or more of using water with a different salinity, adjusting pump speed, and/or adjusting ejector orifice sizes.

* * * * *